(12) United States Patent
Gillis et al.

(10) Patent No.: US 9,259,704 B2
(45) Date of Patent: Feb. 16, 2016

(54) STATIC REACTIVE JET MIXER, AND METHODS OF MIXING DURING AN AMINE-PHOSGENE MIXING PROCESS

(75) Inventors: Paul Aaron Gillis, Lake Jackson, TX (US); Hua Bai, Lake Jackson, TX (US); Joydeep Mukherjee, Missouri City, TX (US); Sanjib Kumar Das Sharma, Pune (IN); Jorg-Peter Gehrke, Stade (DE)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 36 days.

(21) Appl. No.: 13/702,432

(22) PCT Filed: May 10, 2011

(86) PCT No.: PCT/US2011/035959
§ 371 (c)(1),
(2), (4) Date: Dec. 6, 2012

(87) PCT Pub. No.: WO2011/159409
PCT Pub. Date: Dec. 22, 2011

(65) Prior Publication Data
US 2013/0079550 A1    Mar. 28, 2013

Related U.S. Application Data

(60) Provisional application No. 61/354,552, filed on Jun. 14, 2010.

(51) Int. Cl.
*B01F 15/02* (2006.01)
*B01J 19/00* (2006.01)
(Continued)

(52) U.S. Cl.
CPC ............. *B01J 19/0066* (2013.01); *B01F 5/048* (2013.01); *B01F 5/0485* (2013.01); *B01J 4/002* (2013.01);
(Continued)

(58) Field of Classification Search
CPC .... B01F 5/0057; B01F 5/0453; B01F 5/0475; B01F 2015/0221; B01F 5/0485; B01F 5/048
USPC .......... 366/173.1, 177.1, 178.1, 178.2, 178.3, 366/181.6
See application file for complete search history.

(56) References Cited

U.S. PATENT DOCUMENTS 2,164,263 A * 6/1939 Wall ................................ 417/179
4,019,983 A * 4/1977 Mandt ............................ 210/754
(Continued)

FOREIGN PATENT DOCUMENTS

EP    1674152 A2    6/2006
FR    2936959 A3    4/2010
(Continued)

OTHER PUBLICATIONS

International Search Report dated Aug. 17, 2011 for PCT/US2011/035959; 5 pages.
(Continued)

*Primary Examiner* — Tony G Soohoo
(74) *Attorney, Agent, or Firm* — Vedder Price P.C.

(57) ABSTRACT

This disclosure relates to a static mixer (1) with a plurality of nozzles, and more generally, to a mixer and method of use thereof for mixing phosgene and amine with shaped jets or at least two rows of nozzles (15,16) where the second row (16) is used to enrich an area of deficit of the phosgene flow within the static reactive jet mixer (1). Configurations of enriching secondary flow include the use of concentric, eccentric, or offset jets of amine/phosgene, and the use of nozzles with different and irregular geometries to help focus amine/phosgene to a specific area of the principal phosgene flow.

10 Claims, 6 Drawing Sheets

(51) Int. Cl.
*B01F 5/04* (2006.01)
*B01J 4/00* (2006.01)
*B01J 19/18* (2006.01)

(52) U.S. Cl.
CPC ...... *B01J 19/1812* (2013.01); *B01F 2215/0036* (2013.01); *B01F 2215/044* (2013.01); *B01F 2215/045* (2013.01); *B01F 2215/0468* (2013.01); *B01J 2204/002* (2013.01); *B01J 2219/00247* (2013.01)

(56) References Cited

U.S. PATENT DOCUMENTS

| | | | | |
|---|---|---|---|---|
| 4,189,243 | A * | 2/1980 | Black | 366/336 |
| 4,398,827 | A * | 8/1983 | Dietrich | 366/107 |
| 4,474,477 | A * | 10/1984 | Smith et al. | 366/165.5 |
| 4,487,553 | A * | 12/1984 | Nagata | 417/171 |
| 4,519,423 | A * | 5/1985 | Ho et al. | 137/888 |
| 4,954,147 | A * | 9/1990 | Galgon | 95/263 |
| 5,492,404 | A * | 2/1996 | Smith | 366/165.1 |
| 6,659,636 | B1 * | 12/2003 | Matula | 366/165.1 |
| 2003/0166965 | A1 | 9/2003 | Wolfert et al. | |
| 2008/0274040 | A1 | 11/2008 | Flynn | |
| 2011/0251425 | A1 | 10/2011 | Penzel et al. | |

FOREIGN PATENT DOCUMENTS

| | | |
|---|---|---|
| JP | S55-9634 | 3/1980 |
| JP | 2003-535064 | 11/2003 |
| SU | 1212531 A1 | 2/1986 |
| WO | 2002-002210 | 1/2002 |
| WO | W02007-06660 A1 | 6/2007 |
| WO | 2010-015667 | 2/2011 |

OTHER PUBLICATIONS

Official Action dated Mar. 10, 2015 issued in corresponding Japanese App. No. 2013-515341.

Official Action dated Mar. 26, 2015 issued in correspondence Chinese App. No. 201180038509.X.

* cited by examiner

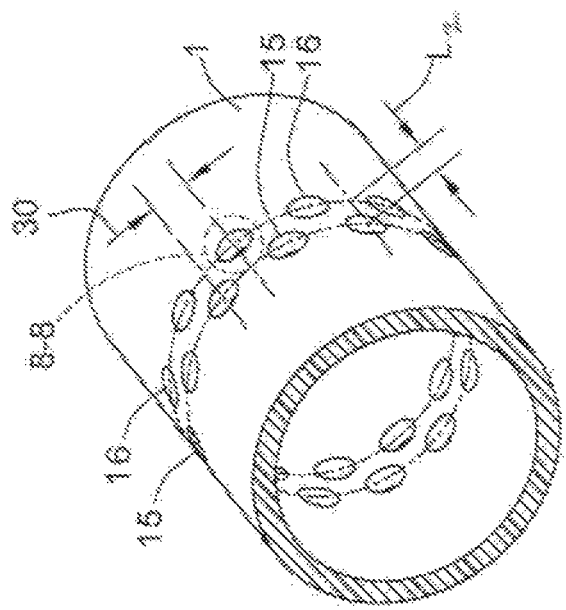
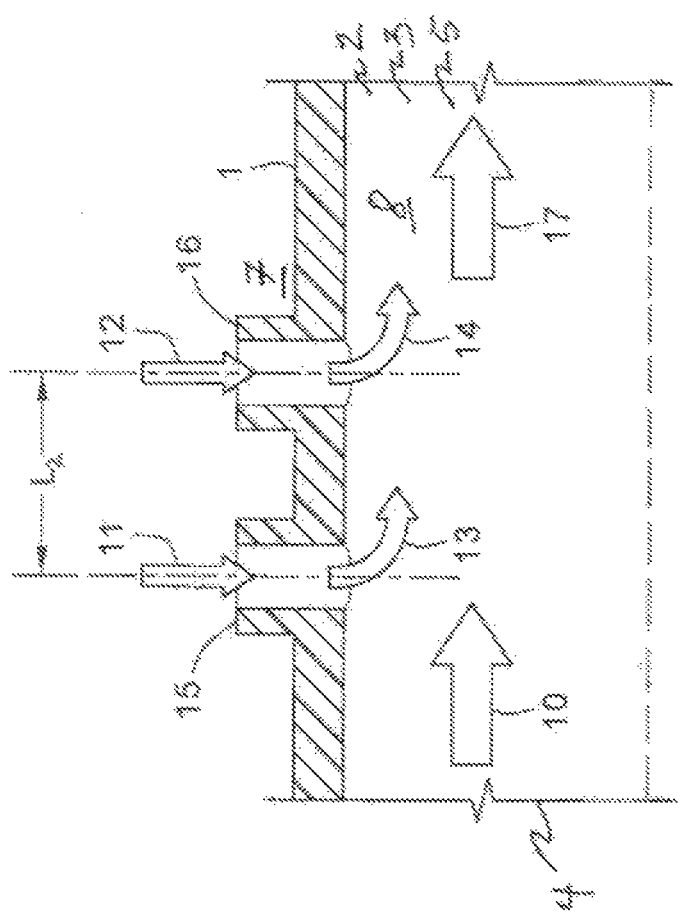
FIG. 4
FIG. 3

STATIC REACTIVE JET MIXER, AND METHODS OF MIXING DURING AN AMINE-PHOSGENE MIXING PROCESS

FIELD OF THE DISCLOSURE

This disclosure relates to a static mixer with multiple nozzles, and more generally, to a static reactive jet mixer and method of use thereof for mixing phosgene and amine where an additional row(s) of nozzles and/or nozzle shaping is used to locally enrich a portion of the phosgene flow to limit formation of undesired secondary reaction in the flow.

BACKGROUND

The field of conventional mixing devices can be roughly divided into two main areas: dynamic mixers and static mixers. Dynamic or mechanical mixers rely on some type of moving part to ensure the desired and/or thorough mixing of products. Static mixers generally have no prominent moving parts and instead rely on pressure differentials within the fluids being mixed to facilitate mixing. The current disclosure is mostly directed to a static mixer but could also be applicable to dynamic mixers.

Isocyanates are molecules characterized by N=C=O functional groups. The most widely used isocyanates are aromatic compounds derived from benzene. Two polyisocyanates are widely produced commercially, namely, toluene diisocyanate (TDI) and polymeric methylenediphenyl-diisocyanate (PMDI). PMDI is a mixture of polymethylene diisocyanate and the monomeric methylenediphenyldiisocyate isomers. Ultimately, these isocyanates are reacted with polyols to form polyurethanes. Two of the major polyurethane applications are rigid foams for appliance insulation and automotive parts and flexible foams for mattresses and seating. The reaction between the amine and phosgene normally occurs at conditions where there are both mass-transfer limited or mixing controlled as well as kinetically controlled reactions. Yield losses and product quality are affected by the formation of urea and urea-derivatives in the production process. Phosgene should engulf the amine stream to minimize secondary reactions.

Mixing is important in PMDI and TDI production. The PMDI product quality and TDI yield is dependent on a multistep chemical reaction network, including a first step where two continuous streams of reactants are directed into a mixer and where, because of the residual reactivity of the compound produced in a first step of the process, secondary effects or reactions created after the primary reaction occur and ultimately reduce the quality of the product composition. For example, in the case of phosgenation chemistry, methylenedi (phenylamine) (MDA or PMDA), also referred to herein as amine, is mixed with $COCl_2$ (phosgene) to create a mixture of Hydrochloric Acid (HCl) and Carbamyl Chloride. The chemical reaction can be depicted as follows:

The Carbamyl Chloride will then decompose to isocyanate. While the production of isocyanates is desired, secondary reactions can lead to the creation of undesired by-products. Some of these secondary reactions are believed to create products such as amine hydrochloride, urea, carbodiimides, and uretonimines. Uretonimines are formed from the reaction of a carbodiimide with an isocyanate and are often called APA (Addition Product A). Since the formation of by-products, such as urea and/or uretonimines, is undesirable, the increase of the ratio of phosgene to PMDA, a dilution of PMDA in a solvent, or an improved mixing minimizes the formation of undesired by-products and fouling. Many known and unknown factors control the quality of the principal reaction.

In addition to by-product formation, improper mixing can contribute to mixer fouling. Consequently, mixer designs with improper mixing can result in lower overall yield of the desired product or can generate a product that clogs or fouls the reactor system leading to down time and/or increased maintenance costs. U.S. patent application Ser. No. 11/658,193, having a least partial common inventorship, is directed to a tapered aperture static mixer. In this application, multi-tee mixers include a tee-pipe junction and a straight pipe section with nozzles and blind flanges for the rapid initiation of the chemical reaction. The junction at these prior art multi-tee static mixers includes a mixing chamber having separate inlets for at least two components and an outlet. The inlet for one of the components is defined along a longitudinal axis of the multi-tee mixer and the inlet for the other component(s) is formed as a plurality of nozzles or jets disposed around the circumference of the mixing chamber and oriented normal to the longitudinal axis of the multi-tee mixer.

In another reference, U.S. patent application Ser. No. 12/725,262 filed on Mar. 16, 2010, also by at least a partial common inventorship, the length of the principal conduit downstream of a mixing area is minimized to limit improper mixing and the creation of by-products. In yet another reference, U.S. patent application Ser. No. 12/725,266 filed on Mar. 16, 2010, also by at least a partial common inventorship, improper mixing is reduced via the introduction of a guide element into the main conduit of a static reactor to create uniform flow of incoming phosgene into a ring of limited thickness so circumferential nozzles can spread amine with a greater contact area of phosgene. While these references teach improved mixing and are incorporated fully herein by reference, further improvements are desirable to enhance mixing of component materials.

FIG. 1 shows phosgene concentrations within a fluid receiving chamber within a first cylindrical conduit where a flow of phosgene from the left to the right of the figure evolves. Amine is jetted into an incoming flow of a first component. As the amine traverses and reacts with the phosgene, principal and secondary reactions occur. A circle disposed at the distance L illustrates a region on the downstream side of the amine jet where the phosgene concentration is relatively low (near zero). The associated temperature map shown as FIG. 2 illustrates the distribution of temperature within the mixture due to the overall exothermic chemical reactions. Again, the circle disposed at distance $L_1$ downstream from the nozzle is shown to be farther than the distance L at FIG. 1, and the local temperature is increased promoting the formation of secondary reactions and associated by-products. While one location of relatively low phosgene concentration (L) and of increased local temperature ($L_1$) is shown at FIGS. 1-2, one of ordinary skill in the art will recognize that these values are only indicative of the general effect and may change based on a plurality of factors including but not limited to fluid viscosity, fluid velocity, temperature, reactant concentrations, pressure, etc.

What is needed is a static reactive jet mixer capable of limiting peaks of concentration and temperature within the principal stream of phosgene and amine during the mixing process thus limiting the production of urea or other undesired by-products in the static mixer.

SUMMARY

This disclosure relates to a static reactive jet mixer with a plurality of nozzles, and more generally, to a mixer and method of use thereof for mixing phosgene and amine with either shaped jets or secondary rows of nozzles, or a combination of both, are used to enrich a phosgene deficient region within the static reactive jet mixer. Configurations of enriching secondary flow include the use of an offset or staggered row of nozzles of phosgene placed downstream from the flow of the first row of amine nozzles, the use of concentric, eccentric, or offset jets of amine/phosgene, the use of nozzles with different and irregular geometries to help enrich the phosgene to specific areas around the principal amine flow.

BRIEF DESCRIPTION OF THE DRAWINGS

Certain preferred embodiments are shown in the drawings. However, it is understood that the present disclosure is not limited to the arrangements and instrumentality shown in the attached drawings.

FIG. 3 is an illustration of a static mixer with a first row of nozzles and a second row of nozzles located offset by a distance $L_2$ from the first row according to an embodiment of the present disclosure.

FIG. 4 is an isometric illustration of the static mixer of FIG. 3 where the second row of nozzles is offset by a distance $L_2$ and is staggered from the first row according to an embodiment of the present disclosure.

DETAILED DESCRIPTION

Figure 2:
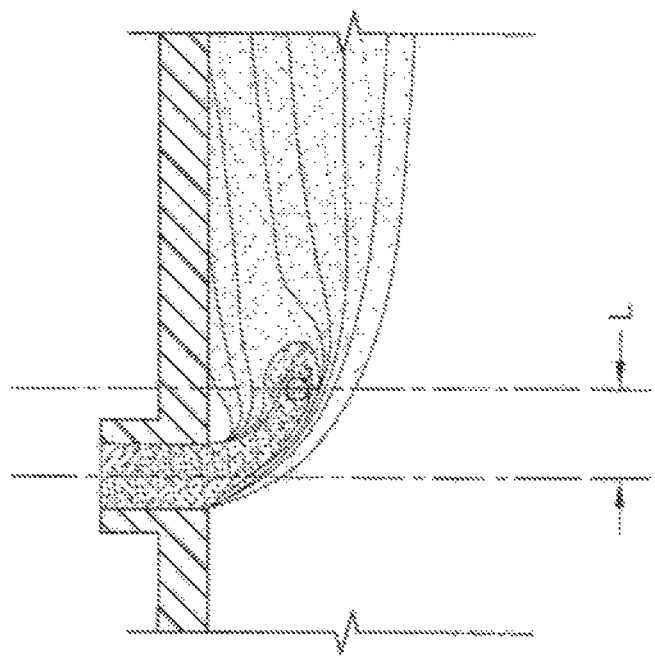
FIG. 2 is an illustration of the temperature distribution in FIG. 1.

For the purposes of promoting and understanding the invention and principles disclosed herein, reference is now made to the preferred embodiments illustrated in the drawings, and specific language is used to describe the same. It is nevertheless understood that no limitation of the scope of the invention is thereby intended. Such alterations and further modifications in the illustrated devices and such further applications of the principles disclosed as illustrated herein are contemplated as would normally occur to one skilled in the art to which this disclosure relates.

Certain of the figures illustrate vertical flow inlets located on the upper portion of the mixer wall coming into a horizontal flow located below the inlets moving from left to right. Below the horizontal flow may be illustrated a flat wall or a line. While one illustrative representation is shown, one of ordinary skill will understand that FIGS. 1, 2, 3, 6, 7, and 10 illustrate the entire structure where inlets can be symmetrically found around the entire periphery of the mixer, while in other figures, such as FIG. 3, the horizontal structure below the flow is useful to help define a flow space and represents a symmetry line, other structures, or the like.

Figure 1:
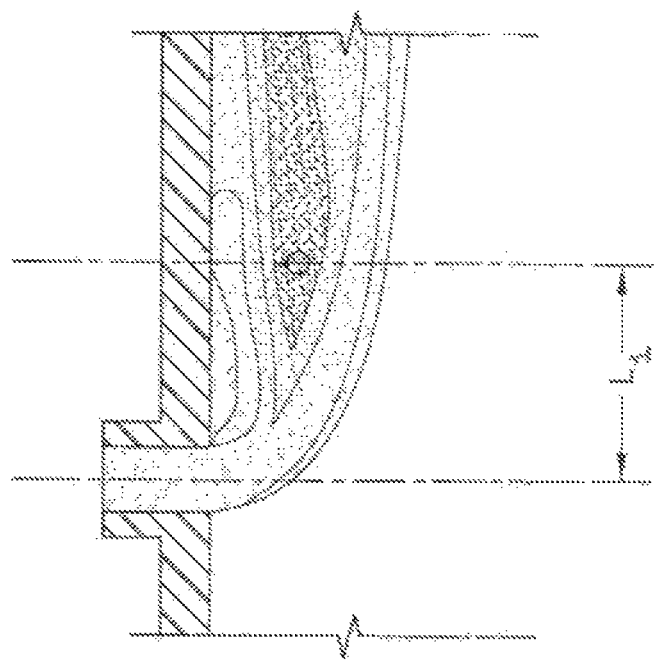
FIG. 1 is an illustration of the distribution of a second component into a flow of a first component showing a concentration deficit area of the first component.

In most static reactive jet mixers, an amine stream usually containing solvent flows through nozzles into a principal cross-flow of phosgene. This "cross-flow" can refer to a number of different configurations and associated geometries where jets of amine enter a phosgene stream at different angles, directions, speeds, and penetration properties. Amine jets further create turbulent wakes downstream of introduction and result in phosgene-deficient regions and heated areas as shown in FIGS. 1 and 2. Several novel jet designs are shown to improve the amine distribution within the cross-flow of phosgene. These designs enrich the phosgene-deficient region with phosgene and reduce the temperature of the amine-phosgene interface. Several configurations are contemplated, namely; the use of multiple rows of tapered or non-tapered nozzles for the introduction of amine stream, or phosgene; the use of shaped nozzles to alter the distribution of the incoming amine jet into the flow of phosgene; and the use of "jet-in-jet" hybrid nozzles where the principal flow of a nozzle is surrounded by the flow from a concentric, eccentric, or irregularly shaped secondary nozzle.

FIGS. 1 and 2 illustrate volumetric distribution and temperature distributions of a flow of a second component within a first component moving in a fluid receiving chamber for mixing. What is shown is how at a fixed distance, shown as L in FIG. 1, a phosgene deficit exists, near this region is where a second row of nozzles can be added to alleviate this deficit. FIG. 2 shows that temperature increases downstream of an amine jet at a distance $L_1$. One object of this disclosure is to introduce a secondary jet of phosgene at a point distant $L_2$ from a first nozzle to enrich phosgene at a phosgene deficient region.

Figure 8:
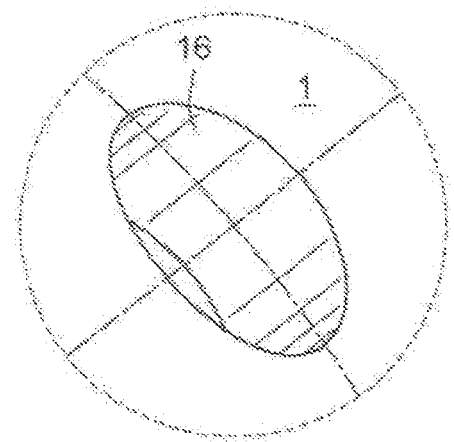
FIG. 8 is a close-up view of a nozzle portion of FIG. 4.
Figure 9:
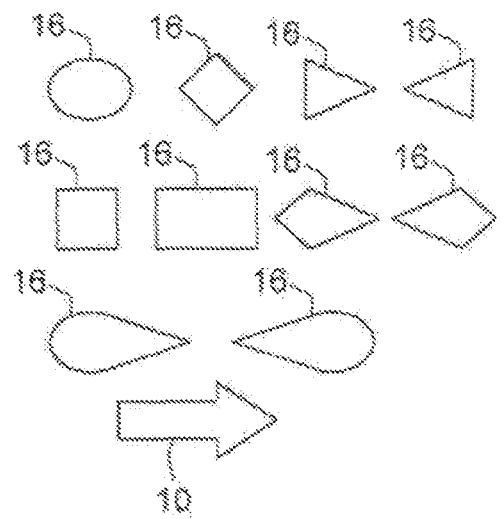
FIG. 9 illustrates a series of possible shapes of nozzles as shown in FIG. 8.

FIG. 3 illustrates with arrows 10-14 and 17 the flows of a first and a second component, such as phosgene and amine, respectively, with or without solvent within a static reactive jet mixer 1 according to a first embodiment. In this embodiment, a second row of nozzles 16 is placed at an offset distance $L_2$ from a first row of nozzles 15 along the main body of the mixer 1. A first component, such as phosgene or phosgene with solvent, flows in the mixer 1 as illustrated by arrow 10. A second component, such as an amine 11 or amine with solvent, is then mixed with the first component as shown by arrow 13 at a first row of nozzles 15. While a T-shaped nozzle is shown, what is contemplated is the use of any nozzle shape and angle, including but not limited to tapered nozzles as shown, for example, in FIG. 6, or nozzles having different shapes as shown in FIGS. 8-9.

Figure 5:
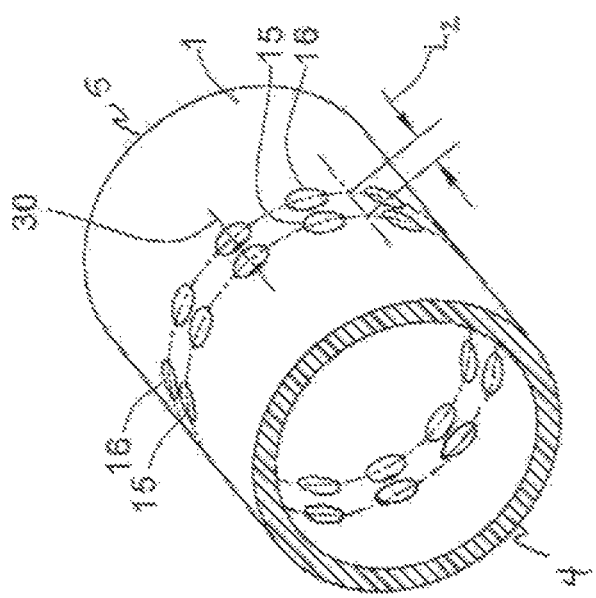
FIG. 5 is an isometric illustration of the static mixer of FIG. 3 where the second row of nozzles is offset by a distance L from the first row according to another embodiment of the present disclosure.

In the mixer 1 as shown in a perspective view in FIGS. 4 and 5, a second row of nozzles 16 is placed downstream from the first row of nozzles 15 at a distance $L_2$ in either a staggered configuration as shown in FIG. 4 or simply offset longitudinally as shown in FIG. 5. A second flow of the first component 12 is added to the mixture at 14 at a distance offset by $L_2$ from the first introduction of the second component via the nozzles 16 to dilute and cool the flow at a specific area of concentration or temperature within the mixing flow as illustrated in FIGS. 1 and 2. In one embodiment, phosgene or a composition made of phosgene and solvent is inserted in the mixer 1. In one preferred embodiment, at nozzle 11, a flow of amine is inserted and a second flow of phosgene is added to the mixture at nozzle 12 to help compensate for any deficit.

In another embodiment shown in FIG. 4, the second flow of the first component 12 is added to the mixture at 16 or a distance offset $L_2$ from the first introduction and also staggered halfway between two nozzles 15. One of ordinary skill in the art of mixing understands that while a fixed distance $L_2$ is shown, what is contemplated is the placement of offset nozzles 16, when compared with a primary set of nozzles 15, by a fixed or variable distance from the first set of nozzles 15 based on the different characteristics of the components to enrich an impoverished area of a first component or to dilute an area and create a flow that locally enriches the concentration of first component and reduces the formation of undesired byproducts from the principal reaction. For example, if a solvent or any other element or additive, such as phosgene is added to the primary flow of the first component, the flow 10 may increase in velocity, thus resulting in a change in the position of the impoverished area and an increase of the distance L. If the pressure of the second component is increased at the inlet nozzle for the second component, the flow may be changed and the distance L may also vary accordingly. Therefore, one of ordinary skill in the art will recognize the need to determine the effective distance $L_2$ for each configuration of mixture.

Mixers 1 as illustrated in FIGS. 4 and 5 may be made of a cylindrical body where phosgene flows longitudinally from one end 4 to the opposite end 5 of a long, cylindrical conduit as shown. Amine as the second component can then be inserted through perpendicular nozzles 15, 16 as shown in FIGS. 4 and 5. Other embodiments include the use of longitudinal conduits made in the external shell wall 7 of the mixer 1 as shown in FIGS. 6, 7, 10, and 12, with or without perpendicular or tapered nozzles. For example, the mixer 1 of FIG. 7 includes both a longitudinal flow conduit 62 and a perpendicular flow conduit 60. In the embodiment shown in FIG. 6, the mixer 1 is made of opposite end shells 40, 41 that are interlocked at an interface 44 and where each end shell 40, 41 includes a secondary conduit 64 and a tertiary conduit 63, respectively, for the transportation of the a component to either the first row of nozzles 15 or the second row of nozzles 16.

While two types of conduits (perpendicular nozzle conduit and longitudinal nozzle conduit) are shown in the different illustrated embodiments, the use of any type and geometry of conduit at any attack angle to supply the first row of nozzles and the second row of nozzles with the first and second components is contemplated.

Figure 7:
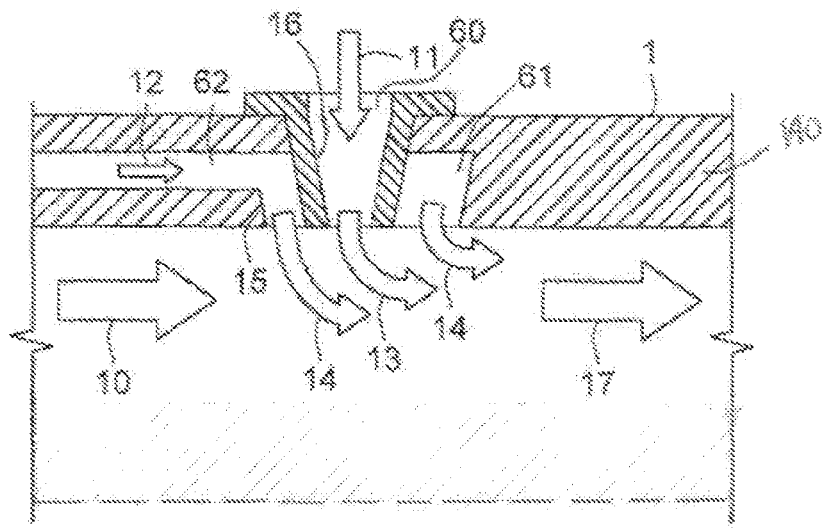
FIG. 7 is a plan view of a static reactive jet mixer with an enrichment system where the first and second rows of nozzles are concentric and where the first row of nozzles is connected to a longitudinal conduit and the second row of nozzles is perpendicular to the external circumferential wall according to another embodiment of the present disclosure.
Figure 10:
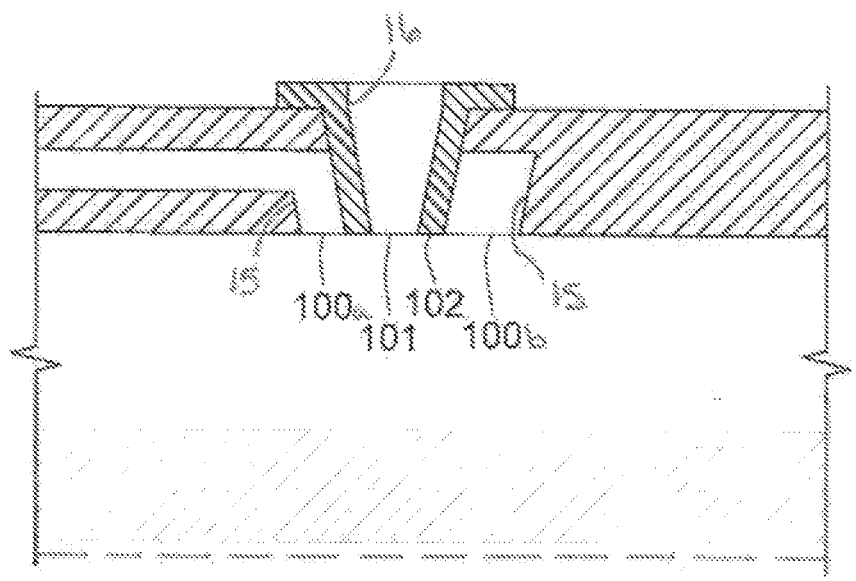
FIG. 10 is a diagram illustrating an offset concentric nozzle-in-nozzle mixer of FIG. 7.

FIG. 8 is a detail illustration taken from FIG. 4 illustrating a circular nozzle 16 outlet opening shape. While a nozzle from the second row of nozzles 16 is shown, the description found hereafter is equally applicable to nozzles from the first row 15. Openings as shown in FIG. 7 can be tapered where, for example, the inlet opening is smaller in size than the outlet opening shape. FIG. 9 illustrates a variety of the different shapes that can be used as the inlet or outlet opening of either the first row of nozzles or the second row of nozzles. Arrow 10 as shown in FIG. 9 illustrates the orientation of the different nozzles 16 as placed in relation to the flow of the first component within the mixer 1. FIG. 12 illustrates the inside and/or outside surface of the mixer 1 where the first row of nozzles 60 is located jet-in-jet in a second row of nozzles 62, as described on FIG. 7, a longitudinal flow conduit 62 and a perpendicular flow conduit 60. The internal surface of the first conduit includes a first opening 101 and a second opening 100 as shown in FIGS. 10-11. The surface further includes the end surface of the first nozzle 102.

The inventor has determined that enrichment of the first component, such as phosgene, at a specific point is helpful to reduce by-products and/or the formation of urea. The use of a different internal openings or external openings in the first row of nozzles 15 or the second row of nozzles 16 with varied geometries allows for the introduction of different quantities of either the first component or the second component in a jet-in-jet configuration. In an alternate embodiment, a single row of nozzles 15 is used to mix the components, but by changing the shape of the inlet opening or the outlet opening, the flow of amine can be transformed so amine is sent to preferred areas within the flow of phosgene. For example, a teardrop-shaped opening placed in the direction of the flow of the phosgene as shown in FIG. 9 creates a jet that penetrates deeper into the flow of phosgene.

Figure 11A:
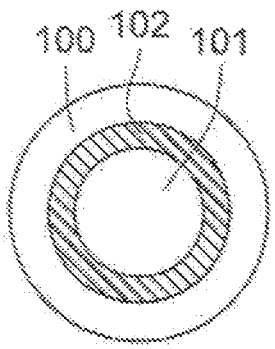
FIG. 11A is a top view of the different surfaces illustrated at FIG. 10 where the second nozzle includes a cylindrical first opening and the second opening is concentric with the first opening.
Figure 11B:
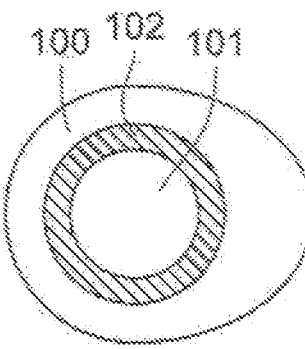
FIG. 11B is a view of a cylindrical first nozzle placed eccentrically in an irregularly shaped opening of the second nozzle according to another embodiment of the present disclosure.
Figure 11C:
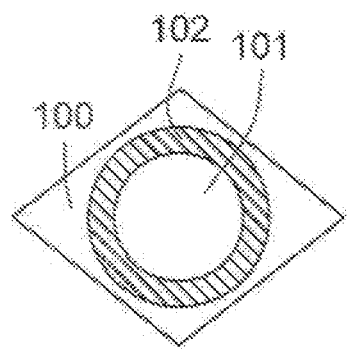
FIG. 11C is a view of a lozenge-shaped second nozzle opening and a circular concentric first nozzle opening according to another embodiment of the present disclosure.
Figure 11D:
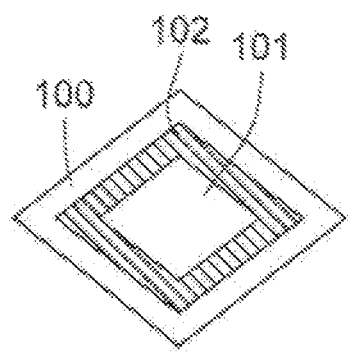
FIG. 11D is a view of a lozenge-shaped second nozzle opening in a lozenge-shaped concentric first nozzle opening according to another embodiment of the present disclosure.
Figure 12:
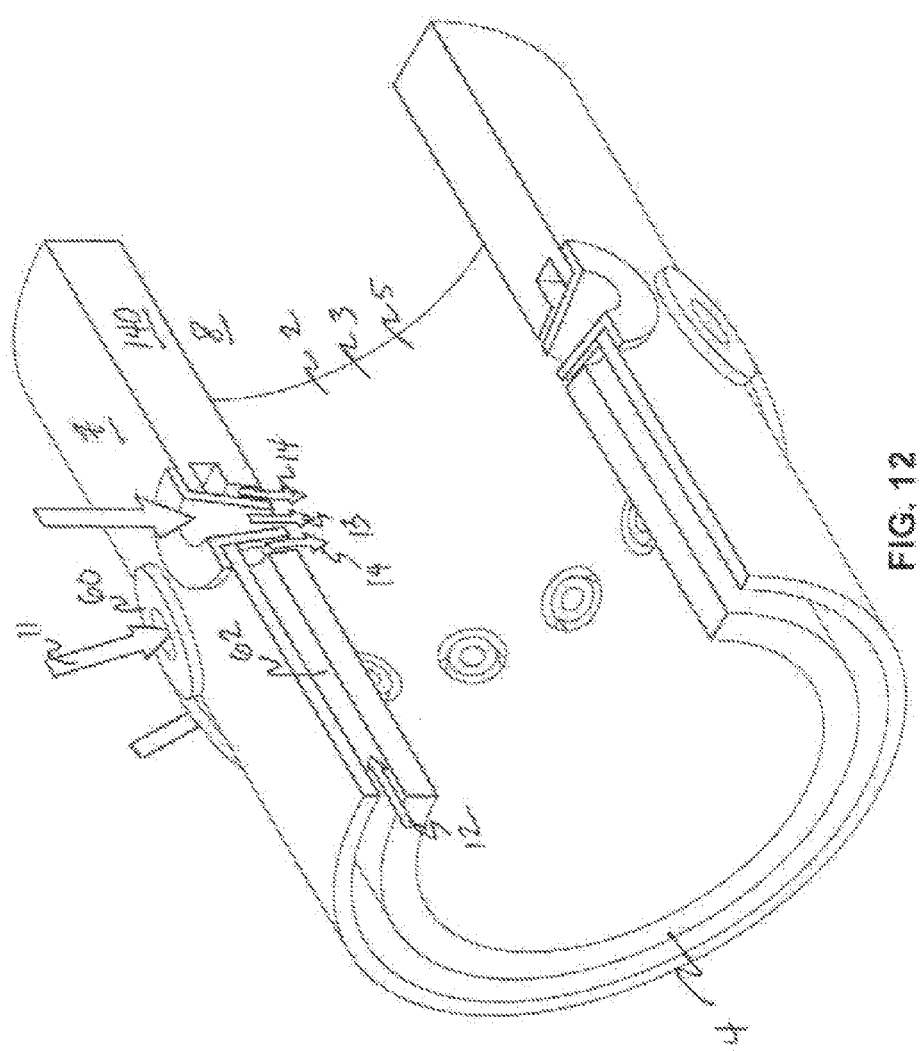
FIG. 12 is a perspective cut away view of the static reactive jet mixer with enrichment system of FIG. 7 according to an embodiment of the present disclosure.

FIGS. 11A-11D show different possible configurations where the first nozzle 15 is located in the second nozzle 16 in a jet-in-jet configuration and where, as shown in FIG. 11B, both nozzles may be offset, concentric, eccentric, or staggered from each other to create an area of more voluminous release of one component than the other. For example, FIG. 10 shows one embodiment of the different possible configurations of FIGS. 11A-11D, i.e., the embodiment of FIG. 11B, where the second or inner nozzle 16 is disposed offset from the first or outer nozzle 15 such that the outer nozzle 15 has a larger opening 100b on the back or downstream side of the inner nozzle 16 when compared to the opening 100a on the front or upstream side of the inner nozzle 16, and the inner nozzle 16 has a tapered wall 102 to opening 101. At a fixed level of pressure, a more voluminous quantity of one component is delivered to the back side of the nozzle-in-nozzle 62 as shown in FIG. 7. While no horizontal flow is shown below the opening 100a, 100b and 101, one of ordinary skill in the art will recognize that flow as described in relation with FIG. 7 is contemplated for FIG. 10.

The present disclosure also describes a static reactive jet mixer 1 with a fluid-receiving chamber 2 for mixing a first component 10 comprising phosgene and a second component 11 comprising amine and a first conduit 3 extending through the fluid-receiving chamber 1 for transporting the first component 10 from an inlet 4 to an outlet 5 and having a first row of nozzles 15 along the first conduit 3 between the inlet 4 and the outlet 5 and an enrichment system, such as a second row of nozzles 16, for curing a deficit in the first component 10 at a mixing point $L_2$ in the fluid-receiving chamber 1.

Figure 6:
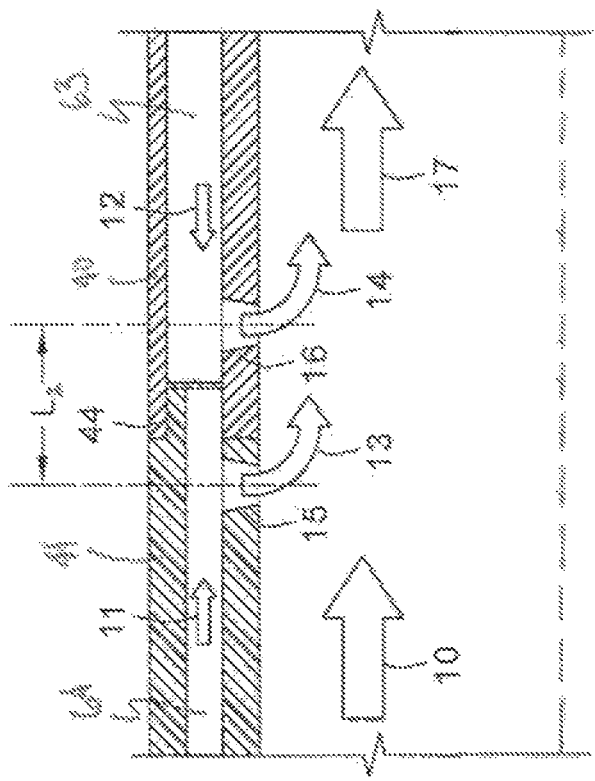
FIG. 6 is a plan view of a static reactive jet mixer where the first and second rows of nozzles are connected to longitudinal conduits within the external circumferential wall according to another embodiment of the present disclosure.

In one embodiment, the fluid-receiving chamber 1 is a continuous cylinder partially shown in FIGS. 6, 7, and 10, which is hollowed by and forming the first conduit 3 having an external circumferential wall 140 as shown on FIG. 12 between an external area of the chamber 7, and an internal area of the chamber 8. FIG. 3 illustrates a first row of nozzles 15 that perforates in a perpendicular configuration the external wall 140 for the passage of the second component 11 from the external area 7 into the internal area 8 for mixing with the first component 10.

As shown on FIG. 9, at least a nozzle from the first row of nozzles 15 has an opening shape selected from a group consisting of a circle, an oval, a triangle, a rectangle, a diamond, and a teardrop shape. The nozzle from the first row 15 may have a different opening shape as shown, for example, in FIG. 11C, where the end surface of the nozzle 102 is circular and the second opening 100 is lozenge-shaped. The different configurations shown in FIGS. 11A-11D illustrate possible jet-in-jet configurations as shown in FIG. 10.

As shown in FIG. 6, external circumferential wall includes a tertiary or third conduit 63 in the wall 40 in communication with a second row of nozzles 16. This third conduit 63 can be placed in a different portion of the wall 40 wherein the second row of nozzles 16 is for the passage of a second source of the second component though the third conduit 63 or for the dilution of the first component by a secondary flow of the first component. The mixer 1 may include a secondary conduit 64 and a tertiary or third conduit 63 in the opposite end shells as shown on each opposite side of interface 44.

In yet another embodiment, the mixer 1 as described above is used to perform a method of mixing during an amine-phosgene mixing process, the method includes the steps of passing a first component 10 through a first conduit 3 that extends through the fluid receiving chamber 2, passing a second component 11 through the first row of nozzles 15 and passing the first component 12 through the second row of nozzles 16 to rapidly mix the first and second components 10, 11, and/or 12 within the fluid receiving chamber 2 of the first conduit 3.

In another contemplated method, the steps include passing a first component 10 through a first conduit 3 that extends through the fluid receiving chamber 2 of a static reactive jet mixer 1, passing the first component such as phosgene through the second row of nozzles 16 as shown in FIGS. 3-7, passing a second component 11 through the first row of nozzles 15, and allowing the first and second components 10, 11, or 12 to rapidly mix in the fluid receiving chamber 2 of the first conduit 3.

EXAMPLES

Combination staggered, jet-in-jet configuration. A series of pilot-plant experiments were conducted to test the combination of jet-in-jet and staggered jet configuration embodiments described herein. A pilot-scale mixer combines a jet-in-jet configuration, as illustrated in FIG. 12, and the staggered jet configuration, as illustrated in FIG. 4. The inner jet diameter is 2.1 mm. Each outer jet has the same discharge area as the inner jet, but is offset from the inner jet central axis by 0.2 mm toward the downstream direction, as shown in FIGS. 7 and 10. The jets are staggered in 2 rows that are 10 mm apart on centerlines. The conduit diameter is 11 mm.

Three flow conditions were tested. In Test 1, the total phosgene flow is 3.6 kg/s at 104° C. and the amine/solvent flow is 2.4 kg/s at 165° C. The phosgene flow is split into 2 feed streams: the main phosgene stream, 80% total phosgene flow, is directed through the 11 mm diameter conduit; the side phosgene stream, 20% total phosgene flow, is directed through the annular jets. The temperatures of the feed streams and the phosgene feed split (80:20) are maintained unchanged for the other 2 tests. In Test 2, the feed flow rates are doubled. In Test 3, the flow rates in Test 2 are kept unchanged but the amine % in the amine/solvent feed stream are increased to 68% from 34% (in Tests 1 and 2).

For comparison purposes, the same 3 tests are repeated for the baseline pilot-scale mixer, which is the same as the staggered jet-in-jet mixer except that the amine jets are replaced with the tapered jets uniformly distributed in a single row. The bore diameter, the tapered angle and the total number of jets are the same for both mixers.

Table 1 summarizes the test results, which are normalized for Test 1 Baseline to illustrate the relative changes. In terms of minimizing by-product concentration, the advantage of the staggered jet-in-jet mixer is consistent in all 3 tests. The by-product concentration is 29% lower than the baseline mixer in Test 1, and it drops even lower in Test 2 but this comes with a cost of significant increase in pressure drop. The by-product concentration is higher in Test 3 than in Test 1, but this is expected due to significantly higher amine percentage. The pressure drops are almost same for the two mixers under the same test condition. In Test 2, the pressure drop increases due to the increase in flow rates.

TABLE 1

Comparison of Staggered Jet-in-Jet mixer with Baseline mixer (Pilot scale)

| Test case | Mixer | By-Product Concentration | Bore Pressure Drop | Pipe Pressure Drop |
|---|---|---|---|---|
| Test 1: Phosgene = 3.6 kg/s; Amine/solvent = 2.4 kg/s; Amine = 34% | Baseline Staggered Jet-in-jet | 100% 71% | 100% 97% | 100% 118% |
| Test 2: Phosgene = 7.2 kg/s; Amine/solvent = 4.8 kg/s; Amine = 34% | Baseline Staggered Jet-in-jet | 77% 65% | 394% 391% | 439% 585% |
| Test 3: Phosgene = 7.2 kg/s; Amine/solvent = 4.8 kg/s; Amine = 68% | Baseline Staggered Jet-in-jet | 169% 142% | 382% 370% | 707% 1058% |

Secondary Jets. A series of pilot-plant experiments were conducted to illustrate the advantages of secondary jets in phosgenation reactive flow and mixing. A configuration similar as shown in FIG. 3 was used. The total phosgene flow is split into two streams: main phosgene, flowing through a one (1) inch conduit and side phosgene, introduced as a second jet downstream of the amine jet approximately ½ inch, directed through a 3/16 inch nozzle. The total phosgene flow-rate is 0.11 kg/s and the temperature of phosgene stream is 50° C. A 0.04 kg/s amine stream (15% (w)—toluene diamine (TDA) or an aliphatic di-amine (ADA) in o-dichlorobenzene (ODCB) solvent) at 100° C. was introduced into the one (1) inch conduit in cross-flow arrangement, similar as illustrated by FIG. 3. The reactive mixture exits into a vessel with a pressure of 20 bar.

Tables 2 and 3 compare the undesired by-product formation in the product as a function of side phosgene jet flow rate for two different amine species (TDA, ADA). The values reported are normalized with respect to the value corresponding to a configuration with all the phosgene flowing through the main conduit. The phosgene can be substituted with a cold solvent. A test was performed with cold solvent (ODCB) in place of the side phosgene jet. The temperature of the cold solvent was 20° C. and flow rate was 25% of that introduced along with amine. The byproduct formation reduced by 4.5% as a result.

TABLE 2:

Comparison for TDA phosgenation

| Side phosgene flow (% total phosgene flow) | By-product formation |
|---|---|
| 0.0 | 100.0% |
| 18.2 | 85.5% |
| 27.3 | 83.6% |
| 36.4 | 82.8% |
| 45.5 | 82.2% |
| 54.5 | 82.1% |

TABLE 3

Comparison for ADA phosgenation

| Side phosgene flow (% total phosgene flow) | By-product formation |
|---|---|
| 0.0 | 100.0% |
| 18.2 | 83.7% |
| 36.4 | 76.0% |
| 54.5 | 68.0% |

A test was performed with cold solvent (ODCB) replacing the phosgene in the downstream jets. The temperature of the cold solvent is 20° C. and flow rate is 25% of that introduced along with amine. As a result the byproduct formation is reduced by 4.5%.

Persons of ordinary skill in the art appreciate that although the teachings of this disclosure have been illustrated in connection with certain embodiments and methods, there is no intent to limit the invention to such embodiments and methods. On the contrary, the intention of this disclosure is to cover all modifications and embodiments falling fairly within the scope the teachings of the disclosure.

What is claimed is:

1. A static reactive jet mixer comprising:
a fluid-receiving chamber for mixing a first component comprising phosgene and a second component comprising amine, a first conduit extending through the fluid-receiving chamber for transporting the first component from an inlet to an outlet and having a first row of nozzles along the first conduit between the inlet and the outlet, and an enrichment system for curing a deficit in first component at a mixing point in the fluid-receiving chamber including a second row of nozzles wherein each individual nozzle of the second row of nozzles is located within an individual nozzle of the first row of nozzles to enrich a deficient region, wherein the fluid receiving chamber is a continuous cylinder hollowed by the first conduit having an external circumferential wall between an external area of the chamber, and an internal area of the chamber wherein the first row of nozzles perforates the external wall for the passage of the second component from the external area into the internal area for mixing with the first component.

2. The static reactive jet mixer of claim 1, wherein the second row of nozzles is connected to a second source of the first component through the external circumferential wall.

3. The static reactive jet mixer of claim 2, wherein the second row of nozzles is offset from the first row of nozzles.

4. The static reactive jet mixer of claim 1, wherein at least a nozzle from the first row of nozzles has an opening shape selected from a group consisting of a circle, an oval, a triangle, a rectangle, a diamond, and a teardrop, and the associated nozzle around the nozzle from the first row has a different opening shape.

5. The static reactive jet mixer of claim 4, wherein the second row of nozzles is offset from the first row of nozzles.

6. The static reactive jet mixer of claim 1, wherein the external circumferential wall includes a third conduit in the wall in communication with the second row of nozzles.

7. The static reactive jet mixer of claim 6, wherein the second row of nozzles allows for the flow of a second source of the first component.

8. The static reactive jet mixer of claim 6, wherein the second row of nozzles is offset from the first row of nozzles by a fixed distance.

9. The static reactive jet mixer of claim 6, wherein at least a nozzle from the first row of nozzles has an opening shape selected from a group consisting of a circle, an oval, a triangle, a rectangle, a diamond, and a teardrop, and the associated nozzle around the nozzle from the first row has a different opening shape.

10. The static reactive jet mixer of claim 1, wherein the fluid-receiving chamber is a continuous cylinder hollowed by the first conduit having an external circumferential wall between an external area of the chamber, and an internal area of the chamber, the external circumferential wall including at least the first row of nozzles and the second row of nozzles both in communication with the internal area of the chamber, and wherein the external circumferential wall includes a second conduit and a third conduit for the passage of at least the second component through the first row of nozzles.

* * * * *